Patented July 9, 1946

2,403,547

UNITED STATES PATENT OFFICE 2,403,547

MANUFACTURE OF ARTIFICIAL EDIBLE CHERRIES, SOFT SHEETS, AND THE LIKE

William Julius Syplie Peschardt, Pinner, England

No Drawing. Application September 13, 1943, Serial No. 502,220. In Great Britain April 15, 1942

11 Claims. (Cl. 99—131)

This invention relates to a process for manufacturing bodies, sheets and films of a soft and gelatinous or gristly nature impervious to water and gases. The manufactured products are useful for various industrial purposes, and as one example can be used for many of the purposes for which soft rubber is now employed. Sheets or films can be made up into personal protective coverings against water or gases. A particular use for comparatively small bodies made according to the process is that when produced in appropriate shapes and forms and suitably colored and flavored, they can be used as edible imitation cherries and other soft fruits and foodstuffs.

The bodies produced according to the present invention are unaffected by temperatures of the range generally met with in cooking cakes and the like and consequently such bodies, e. g. imitation glacé cherries, are suitable for use in the culinary arts. In addition to producing bodies of the foregoing character suitable for the uses indicated, a further object of the invention is to produce bodies having a degree of semisolidity or hardness which is substantially stable. In this respect the products may be made with various degrees of soft solidity from a sticky gelatinous mass enclosed in an impervious thin flexible skin to a more solid form in which the skin is thicker. This thickness of the skin can be varied and progressively increased by suitably operating the process, i. e. its dimension can be anything from a thin membrane thickening up more and more towards the core of the body as may be required in the resultant product, giving a stiffer elastic semisolid. In all cases the physical consistency produced remains as stable as does the consistency of natural preserved and soft fruits and various other edible jelly-like and rubbery bodies which as one object the invention seeks to simulate, when the artificial products are subjected to the same conditions as their actual counterparts.

The present invention employs sodium alginate as its base. While it is well known that sodium alginate becomes a viscous gluey mass when dissolved in water and is capable of solidification by calcium chloride or alum, this simple process possesses the disadvantage, so far as the present objects are concerned, that the solidified mass first becomes tough and gristly like soft rubber and then rapidly hardens, losing, on drying out, all flexibility and becoming quite unyieldingly hard. The final products are more akin to stone than rubber or jelly in their feel.

According to the present invention, a solution of sodium alginate is formed into bodies of the desired form and the unsolidified formed bodies are then set to the desired degree of solidity by being immersed in a solution containing calcium chloride or alum and also glucose with or without a proportion of invert sugar.

The solution of sodium alginate is made up with glucose, glue, gelatine, agar-agar, sugar syrup, or a cellulose compound known under the registered trade-mark "Cellofas," which is a mixed alkyl ether of cellulose of the type described in British specification No. 469,391. In producing realistic artificial cherries good results are secured by using a syrup of sugar and glucose.

When using sugar and/or glucose, the strength of the alginate solution, which for convenience will be termed the basic stock, may be in the region of 0.25% to 15% of the final syrupy solution or even more according to the grade of alginate used. There is a range of about five or more grades of sodium alginate commercially obtainable from the best and purest to the ordinary and poorest, and the better the grade, the lower the percentage necessary. In making the syrup to receive the alginate it is immaterial whether all sugar or all glucose, or what proportion of each, is employed, but good results are obtainable from the example hereinafter set forth, wherein the sugar has been introduced to give sweetness to the imitation fruits.

In another example of an alginate solution, the sodium alginate is dissolved in hot water (below boiling point) in approximately the proportion of 1 lb. of alginate to 20 lbs of water, and while still warm 2 lbs of Cellofas or 1 lb of gelatine or 1 lb. of agar-agar are added. This example is not so good as the previous one for making edible imitation cherries.

In preparing the calcium chloride or alum solution, herein termed the setting bath, a wide range of proportions of the chloride or alum to glucose is possible; the stronger the chloride or alum the more quickly will the setting and solidification of the bodies of basic stock take place. For example, as little as 1% or 2% or as much as 10% or more calcium chloride in the setting bath may be employed.

EXAMPLE

Basic stock

A syrup is made up from 100 parts by weight of sugar to 20 parts by weight of glucose, and into this syrup is dissolved a quantity of best grade sodium alginate such as that known under the registered trade mark "Manucol" representing about 1% to 2% by weight of the final solution. If it is desired to form a very soft sticky center in the final product 0.5% to 1% of invert sugar or equivalent may be added. Any suitable coloring or flavoring matter may be added to the basic stock.

Setting bath

A 20% aqueous solution of calcium chloride is added to glucose in a proportion to yield 2½% by weight of calcium chloride in the total bath.

The basic stock is in the state of a viscous treacly mass sufficiently fluid to be dropped as globules of requisite size into the setting bath or into molds before immersing in the bath.

To make "cherries," for instance, the basic stock may be fed from a suitable dropper such as a pan having a plurality of nozzles of requisite diameter, e. g. one-quarter or three-eighths of an inch, each controlled by an extrusion piston, whereby the stock may be dropped as detached blobs of predetermined weight into the setting solution. An air-tight skin is immediately formed on the blobs and the latter may be removed from the bath within one minute if the "cherries" are to have a tacky body contained in a very thin skin. For more solid bodies having a thicker and somewhat tougher skin merging inwardly into a more jellified body having only a small tacky core, a period longer than one minute, up to say three or four minutes may be allowed for the immersion. As the time of immersion is increased the whole body can be brought to the semi-solid state of a very stiff jelly if desired. As this time factor depends upon the exact composition of the basic stock (itself dependent upon the grade and percentage of sodium alginate) and also upon the strength of the chloride setting bath, the degree of solidity of the products is best determined empirically by timing and testing a preliminary trial batch prior to running off the main batches.

Shapes and forms other than the spheroidal imparted by a direct dropping process may be secured by molding. For instance, the basic stock may be fed into mold recesses formed in a tray or sheet, and the latter quickly reversed to deposit the molded shapes of stock clear of the molds into the setting bath; the immediate formation of the skin prevents the shapes spreading materially and the pre-molded form is substantially retained.

In more realistic simulation of various berries, small seeds or other edible particles may be applied either to the exterior of the skin alone by any suitable means after setting, or to both the skin and the enclosed body by adding the seeds or the like to the basic stock.

In producing sheets or films, pans or other suitable supports for the layers or membranes of basic stock are filled or coated therewith and immersed in the setting bath. The period of immersion may be adjusted to produce a consistently equal degree of setting or solidity throughout the thickness of the sheet or film. These are stripped off the pans or other carriers after removal from the bath. The carrier may be a textile or other flexible base immersed in the basic stock and then immersed in the setting bath.

The invention includes the products resulting from the herein described process.

I claim:

1. A process for manufacturing soft impervious bodies, sheets and films, comprising forming a viscous solution of sodium alginate into bodies of desired form and then setting said formed bodies to a desired degree of solidity by immersing the unsolidified bodies in a solution containing glucose and calcium chloride.

2. A process for manufacturing soft impervious bodies, sheets and films, comprising forming a viscous solution of sodium alginate and sugar syrup into bodies of desired form and then setting said formed bodies to a desired degree of solidity by immersing the unsolidified bodies in a solution containing glucose and calcium chloride.

3. Edible imitation soft fruits consisting of bodies of sodium alginate having a hardened peripheral portion containing an insoluble alginate and a soft interior.

4. Edible imitation soft fruits consisting of bodies of sodium alginate with sugar syrup having a hardened peripheral portion containing an insoluble alginate and a soft interior.

5. A process for manufacturing soft impervious bodies, sheets and films, comprising forming a viscous solution of a soluble alginate into bodies of desired form and then setting said formed bodies to a desired degree of solidity by immersing the unsolidified bodies in a solution containing glucose and calcium chloride.

6. A process for manufacturing soft impervious bodies, sheets and films, comprising forming a viscous solution of sodium alginate into bodies of desired form and then setting said formed bodies to a desired degree of solidity by immersing the unsolidified bodies in a solution containing glucose and calcium chloride.

7. A process for manufacturing edible imitation cherries and other soft fruits and foodstuffs, consisting in making a basic stock by dissolving 1% to 2% by weight of sodium alginate in a syrup comprising 100 parts sugar and 20 parts glucose (by weight), forming bodies from this basic stock, and immersing said formed bodies in a setting bath comprising a 20% aqueous solution of calcium chloride added to glucose in a proportion to yield 2½% by weight of calcium chloride in the total bath.

8. A process for manufacturing edible imitation cherries, consisting in making a solution of sodium alginate in a sugar syrup, forming blobs of suitable size of said solution, dropping said blobs into a setting solution containing calcium chloride and glucose, keeping said blobs immersed for a time sufficient to form skins on said blobs enclosing a soft jelly-like mass with a tacky core, and then removing said blobs with the skins thereon from the setting solution.

9. A process for manufacturing soft impervious bodies, at least the outer portions of which are insoluble in water, comprising forming a viscous solution of sodium alginate into bodies of desired form and then setting said formed bodies to a desired degree of solidity by immersing the unsolidified bodies in an aqueous solution containing as its principal solutes glucose and calcium chloride.

10. Edible imitation soft fruits consisting of bodies of sodium alginate having a soft interior portion and a hardened exterior portion which comprises as its principal constituent calcium alginate.

11. Edible imitation soft fruits consisting of bodies of sodium alginate with sugar syrups, said bodies having a soft interior portion and a hardened exterior portion which comprises as its principal constituent calcium alginate.

WILLIAM JULIUS SYPLIE PESCHARDT.